United States Patent [19]

Ciuba

[11] 4,282,111

[45] Aug. 4, 1981

[54] HYDROQUINONE AS AN OXYGEN SCAVENGER IN AN AQUEOUS MEDIUM

[75] Inventor: Stanley J. Ciuba, Burnsville, Minn.

[73] Assignee: Betz Laboratories, Inc., Trevose, Pa.

[21] Appl. No.: 144,725

[22] Filed: Apr. 28, 1980

[51] Int. Cl.³ .......................... C02B 1/10; C09K 3/00; C23F 11/06; C23F 11/12

[52] U.S. Cl. ................................... 252/178; 210/749; 252/393; 422/13; 422/14

[58] Field of Search ....................... 422/13, 14, 16, 17; 252/178, 393, 404; 210/59

[56] References Cited

U.S. PATENT DOCUMENTS

| | | | |
|---|---|---|---|
| 1,988,823 | 1/1935 | Winning | 252/393 |
| 1,995,063 | 3/1935 | Harris | 252/404 |
| 2,002,523 | 5/1935 | Buc | 252/393 |
| 2,472,684 | 6/1949 | Rossi | 252/393 |
| 3,277,120 | 10/1966 | Fullhart | 252/393 |
| 3,551,349 | 12/1970 | Kallfass | 252/392 |
| 3,625,888 | 12/1971 | Redmore | 252/389 |
| 3,728,281 | 4/1973 | Marks | 252/392 |
| 3,764,548 | 10/1973 | Redmore | 252/387 |
| 3,770,055 | 11/1973 | Larsen | 252/392 |
| 3,808,138 | 4/1974 | Yamaguchi | 252/188 |
| 3,843,547 | 10/1974 | Kaufman | 252/184 |
| 3,976,593 | 8/1976 | Hartke | 252/391 |
| 3,983,048 | 9/1976 | Schiessl | 252/178 |
| 4,012,195 | 3/1977 | Noack | 252/389 R |
| 4,079,018 | 3/1978 | Noack | 252/389 R |
| 4,124,500 | 11/1978 | Arghiropoulos | 252/393 |

*Primary Examiner*—Dennis L. Albrecht
*Attorney, Agent, or Firm*—Alexander D. Ricci; Bruce E. Peacock

[57] ABSTRACT

A method is disclosed for reducing the oxygen content of water using a hydrazine-free aqueous solution of hydroquinone.

12 Claims, No Drawings

HYDROQUINONE AS AN OXYGEN SCAVENGER IN AN AQUEOUS MEDIUM

TECHNICAL FIELD

From a corrosion point of view, the presence of dissolved gases, even in small amounts, is undesirable in water systems which contact metal surfaces. For example, metal surfaces in contact with oxygen-containing industrial water can experience severe pitting. Pitting is highly concentrated corrosion affecting only a small area of the total metal surfaces. This can, however, be a serious problem causing metal failure even though only a small amount of metal is lost and the overall corrosion rate is relatively low.

With respect to oxygen, the severity of attack will depend on the concentration of dissolved oxygen in the water, water pH and temperature. As water temperature increases, as for example in a water heating system, enough driving force is added to the corrosion reaction that small amounts of dissolved oxygen in the water can cause serious problems. Oxygen pitting is considered to be a most serious problem in boiler systems, even where only trace amounts of oxygen are present.

Deaeration is a widely used method for removing oxygen from an oxygen-containing aqueous medium. It is particularly useful for treating boiler feedwater and can be either mechanical or chemical.

While vacuum deaeration has proven to be a useful mechanical deaeration method for treating water distributing systems, boiler feedwater is treated using pressure deaeration with steam as the purge gas. According to the pressure deaeration method for preparing boiler feedwater, the water is sprayed into a steam atmosphere and is heated to a temperature at which the solubility of oxygen in the water is low. About 90 to 95 percent of the oxygen in the feedwater is released to the steam and is purged from the system by venting.

Mechanical deaeration is considered an important first step in removing dissolved oxygen from boiler feedwater. However, as already noted, as water temperature increases, even trace amounts of dissolved oxygen can cause serious problems. Accordingly, supplemental chemical deaeration is often required.

For boilers below 1000 pounds per square inch (psi), catalyzed sodium sulfite is used as an oxygen scavenger for the chemical deaeration of the feedwater. This chemical's oxygen scavenging property is illustrated by the reaction:

$$2Na_2SO_3 + O_2 = 2Na_2SO_4$$

Sodium Sulfite + Oxygen = Sodium Sulfate

The oxygen-sulfite reaction can be effectively catalyzed by iron, copper, cobalt, nickel and/or manganese. While the sodium sulfite oxygen scavenger is often used with success, this material still has its limitations. At boiler operating pressures of 900 to 1000 psi and above, increased dissolved solids from the sulfite-oxygen reaction product can become a significant problem. Also, at high pressures the sulfite decomposes in the boiler to form sulfur dioxide and hydrogen sulfide, both of which can cause corrosion in the return condensate system.

Hydrazine is also used as an oxygen scavenger according to the reaction:

$$N_2H_4 + O_2 = 2H_2O + N_2$$

Hydrazine + Oxygen = Water + Nitrogen

This chemical does not have the above-noted high pressure limitations of sodium sulfite. For example, since the products of the hydrazine-oxygen reaction are water and nitrogen, no solids are added to the boiler water. Hydrazine as an oxygen scavenger does, however, have its own limitations. A major problem relates to its extreme toxicity and carcinogenicity. Also, the hydrazine-oxygen reaction is very slow at low temperatures which might be encountered such as at room temperature. Above 400° F., hydrazine also decomposes according to:

$$2N_2H_4 = N_2 + H_2 + 2NH_3$$

Hydrazine = Nitrogen + Hydrogen + Ammonia

The ammonia decomposition product can be aggressive to copper or the copper-bearing metallurgies that are found in condensate systems.

DESCRIPTION OF THE INVENTION

The present invention is drawn to the use of hydroquinone as an oxygen scavenger in an oxygen-containing aqueous medium. The present invention is considered to be particularly useful for treating boiler feedwater and, accordingly, will be described in that environment. Not only is this compound less toxic than hydrazine, but it also demonstrated significantly greater reactivity with oxygen at room temperature. Also, this compound is stable to higher temperatures than is hydrazine.

The use of quinones as catalysts for the hydrazine-oxygen reaction in an aqueous medium is well known as evidenced, for example, by U.S. Pat. No. 3,551,349 to Kallfass. This reference discloses the use of these catalysts and hydrazine in a weight ratio of 1:15 to 1:1500 (catalyst:hydrazine). Also for example, U.S. Pat. No. 3,843,547 to Kaufman discloses the use in combination of an aryl amine compound and a quinone compound as a catalyst for hydrazine oxygen scavenger.

Indeed, in the context of this prior art, wherein the use of quinones as catalysts for hydrazine oxygen scavenger is well known, it was unexpectedly found that hydroquinone performed very well alone as an oxygen scavenger. Expressed another way, it was unexpectedly found by the present inventor that hydrazine-free aqueous solution of hydroquinone is quite effective as an oxygen scavenger in an oxygen-containing aqueous medium. As already noted above, not only is this compound less toxic than hydrazine, but it also demonstrated significantly greater reactivity at room temperature. In addition, hydroquinone proved to be stable to higher temperatures than is hydrazine. As noted above, methods in accordance with the present invention are considered to be particularly useful for treating oxygen-containing feedwater to a boiler.

The amount of compound added could vary over a wide range and would depend on such known factors as the nature and severity of the problem being treated. It is believed that the minimum amount of hydroquinone compound could be about 0.05 parts of active compound per million parts of aqueous medium being treated. The preferred minimum is about 0.2 parts per million. it is believed that the amount of hydroquinone compound used could be as high as about 200 parts per million, with about 35 parts per million being the preferred maximum.

The reactivity of hydroquinone with oxygen will depend on such factors as treatment concentration and water temperature and pH. In general aqueous systems where the treatment does not have the benefit of elevated water temperature, it is preferred that the water be of alkaline pH, e.g., greater than about 7.5. Otherwise, even though overfeeding the treatment might perform the necessary oxygen scavenging, economics would make such an approach undesirable. In treating boiler feedwater, it is preferred that once the water reaches the boiler proper, it has an alkaline pH, which is always the case for boilers operating within the ASME guidelines.

In treating boiler feedwater, it is a well known fact that oxygen can get into the boiler from other sources. Accordingly, in keeping with standard practices for treating boiler feedwater, an excess amount of oxygen scavenger should be used to provide a residual amount thereof in the boiler water for the uptake of oxygen from other sources. It is also contemplated that hydroquinone could be used directly in the condensate system when condensed steam has experienced oxygen contamination.

EXAMPLE 1

In a first series of tests, the oxygen scavenging efficacies of various materials were evaluated under conditions of elevated temperature and pressure. The test apparatus used was essentially a stainless steel hot water flow system equipped with appropriate monitoring instrumentation. Demineralized feedwater, adjusted to the appropriate pH and initial dissolved oxygen level (controlled by nitrogen sparging), was pumped from a reservoir at ambient temperature into a once-through heater. Temperature was monitored continuously by means of thermocouples at several locations along the length of the flow tubing. A solution containing the oxygen scavenger test material was loaded into a pump driven syringe and fed continuously to the heated flow stream through a port containing a stainless steel ribbon mixing baffle. The feedwater containing dissolved oxygen and the test material then traversed the flow tubing via a by-pass comprising an additional length of coiled tubing. Contact (or reaction) time of the test material and dissolved oxygen was governed by the choice of coil length. The tendency of the temperature to drop during residence in the coiled tubing was offset by the use of thermostatted heating tapes which maintained the temperature in this tubing at 78°±3° C. Upon exiting the coiled tubing, the stream flowed through a sample cooler to render the temperature of the liquid compatible with the operating range of a membrane-type dissolved oxygen probe. The cooled liquid was analyzed for dissolved oxygen via a D.O. flow cell, and pH was potentiometrically monitored in the flow tube immediately downstream of the D.O. probe. Outputs of the temperature, pH and dissolved oxygen probes during operation were monitored via strip chart recorders. The final destination of the reaction mixture was a reservoir which could be drained for analysis of reaction products, if desired.

A suitable set of operating conditions were found which were not extremely different from those experienced in boiler feedwater systems and which did not result in experimental uncertainties. A flow rate of 300 ml/min. through the apparatus was chosen, since this yielded the optimum response of the dissolved oxygen probe. Temperature in the system could be maintained at 78°±3° C. under 4±1 psig. Residence time of the feedwater in the flow tube from chemical feed point to D.O. flow cell outlet was 4±0.2 minutes. Approximately 3.5 minutes of this total was spent in a 40' length of 0.402 inch i.d. coiled tubing. Entry into and residence in the sample cooler accounted for 0.5 minute of the total contact time.

According to an article by J. W. Cohn and R. E. Powell, Jr., J. Amer. Chem. Soc., 76,2568 (1954), hydrazine exhibits maximum oxygen scavenging efficacy in solution between pH 10.0–10.5. Accordingly, to provide a comparison of hydroquinone with hydrazine the tests were performed in water with a pH in the range 10.0–10.5.

The test solutions were prepared by initially mixing 10 grams of test material and 90 grams of demineralized water in glass bottles and allowing the mixture to remain in a shaker for several hours. If complete dissolution for a given material was observed after shaking, the pH of the solution was measured. When the pH of the solution was below 10.0, 7 N sodium hydroxide was added dropwise until this value was reached. The quantity of added sodium hydroxide was recorded and later used in corrections for the active concentration of the solution. When the pH value of a stock solution was above pH 10.0 without requiring the addition of caustic, the solution was not further modified.

Results of these tests are reported in TABLE 1 below in terms of percent oxygen removed from the test stream. The precision of the initial and final dissolved oxygen values reported is approximately ±10%. Accordingly, values reported for percent oxygen removal which are below 20% may represent experimental artifacts. The experimental uncertainties decrease with increasing values of percent dissolved oxygen removal.

TABLE 1

| Material | Stock[1] Solution Concentration (%) | Feedwater Concentration (ppm) | Feedwater pH[2] | Initial $O_2$ (ppm) | % $O_2$ Removed |
|---|---|---|---|---|---|
| hydrazine | 10.0 | 96 ± 8[3] | 10.3 ± 0.1[3] | 1.8 ± 0.5[3] | 91 ± 4[3] |
| hydroquinone | 4.9 | 100 | 8.9 | 2.3 | 97 |
| p-phenylenediamine | 5.2 | 69 | 10.9 | 2.0 | 35 |
| o-phenylenediamine | 5.8 | 58 | 10.2 | 2.0 | 10 |
| resorcinol | 9.2 | 90 | 9.8 | 1.8 | 0 |

[1] Concentration of the stock solution used for chemical feed after the addition (if necessary) of 7N sodium hydroxide to adjust pH.
[2] These are feedwater pH values downstream of chemical feed point measured at ambient temperature.
[3] Average of 9 runs.

As can be seen from the results reported in TABLE 1, the hydroquinone was at least equivalent to, if not better than, hydrazine with respect to oxygen scavenging in the test water. Of those materials which proved to be ineffective for the purpose of oxygen scavenging o- and p- phenylenediamine and resorcinol, an aromatic meta-diol, are considered to be particularly noteworthy. These materials, although known to be antioxidants, did not work as oxygen scavengers in the tested water system.

EXAMPLE 2

In order to compare the performance of hydroquinone with that of hydrazine under field-type conditions, a series of experiments were conducted on the feedwater of a working boiler. The test materials were fed to the deaerator storage tank, and the resultant change, if any, in dissolved oxygen level was measured on a sample flowing from the feedwater line through a membrane-type dissolved oxygen probe.

The results of these tests are reported below in TABLE 2 in terms of % oxygen removed from the boiler feedwater. During the tests, a relatively wide range of experimental conditions was encountered among the test parameters, reflecting the difficulty of attempting to obtain precise data during experiments performed on a working boiler.

In order to provide some point of reference for judging oxygen scavenging efficacies while taking into account the diverse conditions experienced on a daily basis, hydrazine control runs were performed, whenever possible, under feedwater and boiler conditions similar to those encountered during testing of other test materials. The hydrazine control runs are reported below in TABLE 3 also in terms of % oxygen removal.

TABLE 2

| Material | Feedwater Concentration (ppm Actives) | Feedwater pH | Steam Load (1000 lbs./hr.) | Feedwater[1] Initial $O_2$ (ppb) | % $O_2$ Removed |
|---|---|---|---|---|---|
| hydroquinone | 1.9 | 8.4 | 15 | 10.0 | 90 |
| hydroquinone | 1.9 | 8.4 | 15 | 8.0 | 88 |

[1]Dissolved oxygen concentration of feedwater exiting the deaerator with no chemical feed.

TABLE 3

| Hydrazine Control Run # | Feedwater[1] Concentration (ppm Actives) | Feedwater pH | Steam Load (1000 lbs./hr.) | Feedwater Initial $O_2$ (ppb) | % $O_2$ Removed |
|---|---|---|---|---|---|
| 1 | 1.6 | 8.8 | 11 | 13.0 | 69 |
| 2 | 1.1 | 9.4 | 15 | 4.0 | 50 |
| 3 | 1.2 | 8.6 | 15 | 6.0 | 60 |
| 4 | 1.0 | 8.8 | 15 | 5.8 | 55 |
| 5 | 0.8 | 9.4 | 11 | 3.5 | 31 |
| 6 | 1.6 | 9.6 | 14 | 4.0 | 30 |

[1]All hydrazine concentrations.

Based on the results reported in TABLES 2 and 3, hydroquinone was considered to be efficacious in treating boiler feedwater and compared favorably with hydrazine.

EXAMPLE 3

Presented in TABLE 4 below is data comparing the toxicity of hydrazine with hydroquinone. The data is presented in terms of oral dosage required to kill 50 percent of the test rats (LD50 Oral Rat) and is available in the National Institute for Occupational Safety and Health "Registry of Toxic Effects of Chemical Substances," HEW Publication No. (NIOSH) 76-191 (1976).

TABLE 4

| Material | LD50 Oral Rat (mg/Kg) |
|---|---|
| hydrazine | 60 |
| hydroquinone | 320 |

Based on the data presented in TABLE 4, it can be seen that hydroquinone is significantly less toxic as compared to hydrazine.

EXAMPLE 4

In a further series of tests, the low (room) temperature reactivity with oxygen of hydroquinone was compared to that of hydrazine. The test apparatus basically consisted of a 1 liter three-necked flask fitted with a dissolved oxygen probe and a pH electrode. The intent of this apparatus was to show reaction kinetics differences rather than precise measurements (within seconds) of reaction times.

The flask was filled with deionized water which had been stripped of some dissolved oxygen by bubbling nitrogen through a diffuser stone. The pH was adjusted to the desired level with sodium hydroxide. The flask was sealed with a rubber septum, the dissolved oxygen probe and an inlet stopper. A magnetic stirrer bar was left in the flask for mixing. The mixer was turned on, and dissolved oxygen and temperature readings were recorded until the dissolved oxygen reached a constant value. Next, the appropriate quantity of additive was injected through the septum using a hypodermic syringe. The initial mole ratio of treatment to dissolved oxygen was determined by weighing feed chemical and measuring the oxygen concentration. The volume displacement was effected through a capillary at the top of the probe which did not affect the dissolved oxygen in the flask. Dissolved oxygen and temperature readings were then taken at appropriate time intervals.

The results of these tests are provided below in TABLE 5 in terms of relative amounts of % oxygen removed at the time intervals indicated (1 and 5 minutes). As can be seen in the table, no measurement was made for hydroquinone at the 5 minute interval.

TABLE 5

| Material | pH | Temperature (°C.) | Moles of Treatment Mole of $O_2$ | Initial $O_2$ (ppm) | % $O_2$ Removed 1 Minute | 5 Minutes |
|---|---|---|---|---|---|---|
| hydroquinone | 8.6 | 22.5 | 0.94 | 7.7 | 29 | — |
| hydrazine | 9.2 | 26.5 | 10.5 | 0.87 | 1 | 2 |

These results are seen to demonstrate the superiority of hydroquinone, as compared to hydrazine, with respect to reactivity at low temperature with oxygen. The low amount of dissolved oxygen used in the hydrazine test was compensated for by using a very large stoichiometric excess (greater than 10 moles of hydrazine to 1 mole of oxygen) of treatment.

EXAMPLE 5

Due to the presence of the aromatic ring in hydroquinone, it is believed that this compound has greater thermal stability than hydrazine. To confirm this, thermal decomposition studies for hydrazine and hydroquinone were performed on aqueous solutions of the materials in autoclaves. The aqueous solutions (approximately 50-60 ppm in demineralized water) were subjected to specified temperature and pressure conditions for 4 hours prior to chemical analysis. The results are reported below in TABLE 6 in terms of percent decomposition for the temperature and pressure conditions specified.

TABLE 6

| Hydroquinone (54 ppm) | | | Hydrazine (60 ppm) | | |
|---|---|---|---|---|---|
| Pressure (psig) | Temperature (°F.) | % Decomposition | Pressure (psig) | Temperature (°F.) | % Decomposition |
| 0 | 70 | 0 | 0 | 70 | 0 |
| 500 | 468 | 0 | 435 | 450 | 20 |
| 1000 | 545 | 33 | 1100 | 550 | 52 |
| 1500 | 597 | 54 | 1620 | 600 | 79 |
| 2000 | 636 | 81 | 2000 | 636 | 93 |

These results are seen to clearly demonstrate the superior thermal stability of the hydroquinone as compared to that of hydrazine.

What is claimed is:

1. A method for reducing the amount of oxygen in an oxygen-containing aqueous medium of a boiler condensate steam system comprising adding to said aqueous medium as the sole oxygen scavenger an effective amount for the purpose of a hydrazine-free aqueous solution of hydroquinone.

2. A method according to claim 1, wherein said hydroquinone is added in an amount of about 0.05 to 200 parts per million parts of aqueous medium.

3. A method according to claim 2, wherein said hydroquinone is added in an amount of about 0.2 to 35 parts per million parts of aqueous medium.

4. A method according to claim 3, wherein said aqueous medium has an alkaline pH.

5. A method according to claim 1, wherein said aqueous medium has an alkaline pH.

6. A method according to claims 1 or 4 wherein said hydroquinone is added in an excess amount which is effective to provide a residual amount thereof in the condensate system.

7. A method for reducing the amount of oxygen in oxygen-containing feedwater to a boiler comprising adding to said feedwater as the sole oxygen scavenger an effective amount for the purpose of a hydrazine-free aqueous solution of hydroquinone.

8. A method according to claim 7, wherein said hydroquinone is added in an excess amount which is effective to provide a residual amount thereof in the boiler.

9. A method according to claim 8, wherein said hydroquinone is added in an amount of about 0.05 to 200 parts per million parts of feedwater.

10. A method according to claim 9, wherein said hydroquinone is added in an amount of about 0.2 to 35 parts per million parts of feedwater.

11. A method according to claim 10, wherein said hydrazine-free aqueous solution also contains sodium hydroxide.

12. A method according to claim 7, wherein said feedwater has an alkaline pH.

* * * * *